Sept. 27, 1938.　　　　V. W. KLIESRATH　　　　2,131,184
VEHICLE
Original Filed Jan. 5, 1934　　　2 Sheets-Sheet 1

INVENTOR.
VICTOR W. KLIESRATH
BY
McConkey & Booth
ATTORNEYS.

Sept. 27, 1938.　　　V. W. KLIESRATH　　　2,131,184
VEHICLE
Original Filed Jan. 5, 1934　　2 Sheets-Sheet 2

INVENTOR.
VICTOR W. KLIESRATH
BY
McConkey & Booth
ATTORNEYS.

Patented Sept. 27, 1938

2,131,184

UNITED STATES PATENT OFFICE

2,131,184

VEHICLE

Victor W. Kliesrath, South Bend, Ind., assignor to The Steel Wheel Corporation, Chicago, Ill., a corporation of New York Original application January 5, 1934, Serial No. 705,315. Divided and this application April 30, 1936, Serial No. 77,111

6 Claims. (Cl. 296—28)

This invention relates to vehicles and particularly to a built up dash and toe-board and a novel engine support.

One object of the invention is to provide a transverse dash and toe-board to give a very rigid structure reinforcing the vehicle frame and, if desired, serving as a support for one end of the engine.

Another object is to provide a novel engine mounting.

Preferably the vehicle includes longitudinal side members with a dash bridging across between them at their forward ends. The toe-board and floor-board of the vehicle are so connected to the dash as to reinforce it and suitable reinforcing gussets provide further reinforcement so that a very rigid structure is formed. This structure may serve as a support for the rear end of the engine which is preferably pivotally mounted on bearings formed of registering semi-spherical parts and connected to the engine through rubber bushings.

Other objects, advantages and novel features of the invention will be apparent from the following description when read in connection with the accompanying drawings, in which.

Figure 3:
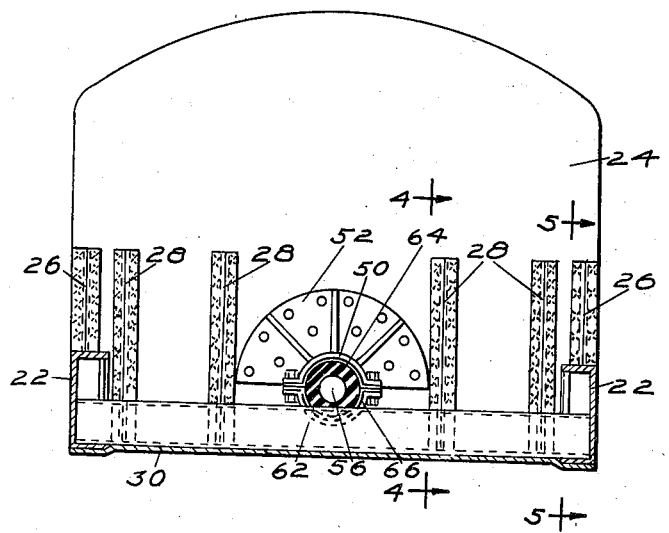
Figure 3 is a section on the line 3—3 of Figure 1.
Figure 4:
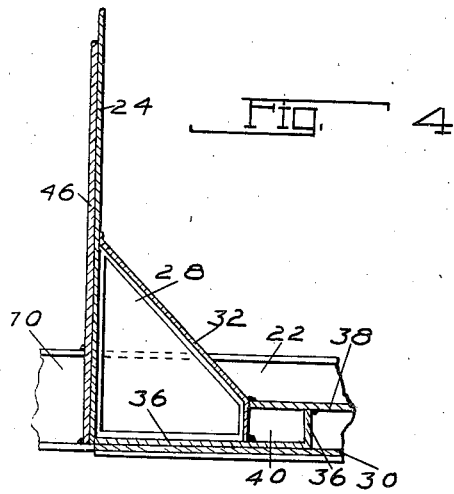
Figure 5:
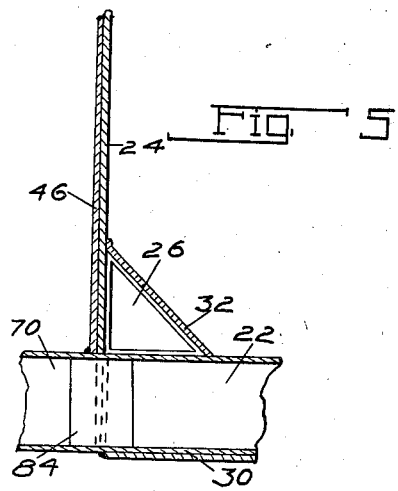

Figures 4 and 5 are sections on the lines 4—4 and 5—5 of Figure 3.

The chassis illustrated includes a suitable base 20 for an automobile body, for example of the type fully described in my application No. 651,821, filed January 14, 1933. This base, as explained in that application, preferably embodies the equivalent of a chassis frame, including channel-section longitudinal side members 22 and various cross members and other parts described below. The channels of the side members 22 face toward the center line of the car.

At the front end of the base 20 is arranged a vertical dash extending transversely entirely across the car. As this dash forms one of the important structural elements of the car, as well as a support for the rear engine bearing, it is important that it be very strong. To this end, it may be built up of a vertical steel plate 24, notched at its sides to fit over the side members 22, and braced at its sides by triangular reinforcing gussets 26 spot-welded or otherwise secured to the rear face of plate 24 and to the upper faces of side members 22.

Each gusset 26 is shown made by spot-welding or otherwise securing together two-stampings formed with oppositely directed flanges which engage and are secured to the plate 24 and the corresponding side member 22. There are also preferably a plurality (e. g. four as illustrated) of other similar but larger intermediate triangular gussets 28 spot-welded or otherwise secured to the plate 24 and to a bottom plate 30 bridging across and preferably welded to the lower faces of the side members 22.

An inclined toe-board 32, formed as a steel stamping, is spot-welded or otherwise secured to the rear face of the plate 24, and to the upper inclined flanges of the gussets 26 and 28, and may if desired be carried down along the rear face of gussets 28 between the side members 22 as shown in Figure 4 and secured as by an arc weld to the upper face of the bottom plate 30.

An auxiliary plate 36 may be provided if desired, however, secured as by spot-welding to the lower edge flanges of the gussets 28 and to the upper surface of the bottom plate 30, and with its rear portion turned vertically and secured as by an arc-weld to the lower face of a foot-well plate 38, the front edge of which may be arc-welded or otherwise secured to the foot-board 32. As best appears in Figure 4, this forms in effect a rectangular cross member 40 connecting the side members 22 at the bottom of the foot-board 32 just behind the gussets 28 bracing the dash plate 24.

As fully explained, and claimed, in my application No. 687,056, filed August 28, 1933, the foot-well plate 38 may be carried upwardly to the level of the upper edges of the side members 22, and continued rearwardly supported on said edges, to form an elevated support for a driver's seat. The steering column 44 is shown mounted on the plate 24 just ahead of the driver's seat.

Figure 1:
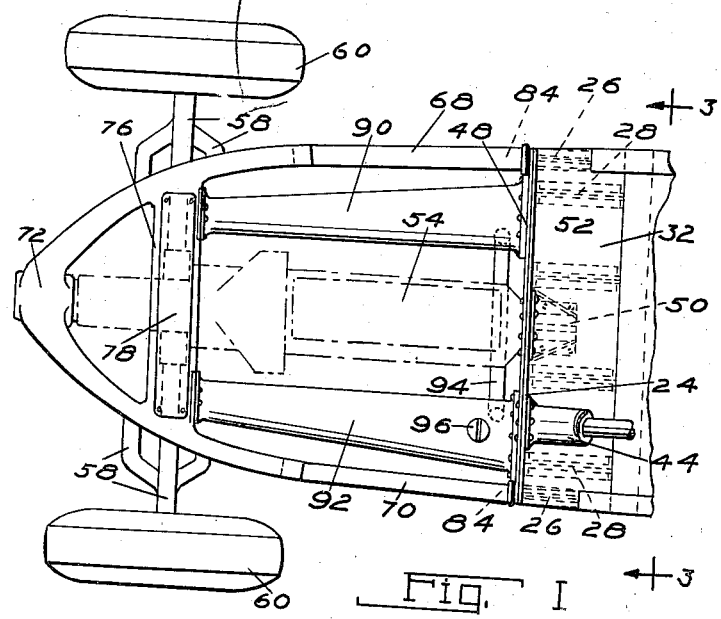
Figure 1 is a partial plan view of an automotive vehicle embodying the invention.
Figure 2:
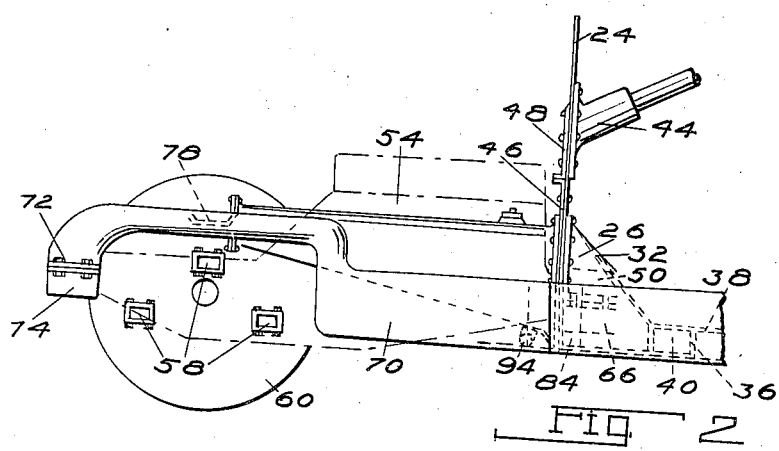
Figure 2 is a partial side elevation of the vehicle of Figure 1.

The lower portion of the front face of the plate 24 is preferably reinforced by a transverse auxiliary plate 46. If desired, as shown in Figure 2, a further transverse reinforcement 48 may be arranged above the auxiliary plate 46, the two plates being shown with interengaging transverse flanges (Figure 2). The plate 46 may be welded permanently to the plate 24, or bolted thereto, and it is shown as cooperating with the plate 24 to carry the top half 50 of a rear bearing 56 for an engine 54, which bearing is formed with a ribbed supporting flange portion or bracket 52 riveted or otherwise secured to the two plates.

While the engine and its mounting may be arranged generally as described and claimed in my above-mentioned application No. 651,821, as noted above one of the purposes of the present invention is to provide an arrangement whereby the engine, with the axle sections 58 and the front wheels 60 arranged as described in said application No. 651,821 may readily be removed as a unit for repair, etc., without disturbing the rest of the car.

To this end, the rear engine supporting bearing 56 is shown having sleeved thereon and vulcanized or otherwise bonded thereto a rubber bushing 62 which in turn is mounted in and similarly bonded in a metal covering or sleeve 64 the upper half of which is received in the half-bearing 50. A detachable cap 66 may be detachably bolted to the part 50 to complete the supporting bearing, and the sleeve 64 may have (as illustrated) ears at its sides which are received between the half-bearing 50 and the cap 66, to hold the rubber bushing 62 against turning. Thus the engine unit is readily detached from the rear supporting bearing by removing the cap 66.

In order to support the front engine bearing (which is built up similarly to the rear bearing described above) the side members 22 are rigidly and permanently secured to side arms 68 and 70 which carry a front half bearing 72 completed by a detachable bolted cap 74 and enclosing a rubber bushing on the front bearing of the engine in the same manner as described for the rear engine support.

The two arms 68 and 70 may be made in one piece, or they may be made separately and welded permanently to the front half bearing 72. They are connected by a bridge or transverse radiator support 76, formed integrally therewith or welded or otherwise secured thereto, and which is formed with a trough 78 receiving the usual radiator core (not shown).

The above described supporting structure may be formed with a box-shaped section as more particularly described in my copending application Serial No. 705,315, now Patent No. 2,066,352, of which this application is a division, and the rear ends of the box-section arms 68 and 70 may fit over connecting sleeves 84 which extend into the open ends of the corresponding side members 22. By permanently securing the sleeves 84 to the members 22 and 68 and 70, for example by welding, these members become in effect one single rigid part, the joint between them actually being stronger than the other portions thereof.

The above structure gives a very strong and rigid support for the front engine mounting, in effect integral with the frame members 22. In order to strengthen it still further, however, I prefer to provide tubular reinforcing members such as two elongated gasoline tanks 90 and 92, the ends of which are welded or otherwise secured in a liquid-tight manner to the radiator support 76 and the plate 46 which forms part of the vertical dash. These tanks are shown connected by a conduit 94 or the like, and are provided with a filler opening closed by a detachable filler cap 96.

It will be noted that the radiator and radiator grille (if one is provided), the hood, the front wheel fenders, the head-lamps, and the like may all be mounted on the arms 68 and 70, and need not be disturbed when the engine and front wheel unit is removed for repair work. The arms 68 and 70 are merely propped up, caps 66 and 74 removed, and the engine unit run out from under the car. Similarly the unit is replaced afterwards without disturbing the other parts.

While only one embodiment of the invention has been shown and described, it is not intended to limit the scope of the invention thereto or otherwise than by the terms of the appended claims.

What is claimed is:

1. A vehicle having side members, a vertical dash member carried by the side members, an inclined toe-board secured to the rear face of the dash member, generally-triangular gussets secured between the dash and the toe-board, and a bottom plate secured to the lower portions of the side members and the bottoms of the gussets.

2. A vehicle having side members, a vertical dash member carried by the front ends of the side members, an inclined toe-board secured to the rear face of the dash member, generally-triangular gussets secured between the toe-board and the dash member, a bottom plate secured to the bottoms of the side members and the bottoms of said gussets, and a floor-board secured between the side members and to the toe-board.

3. A vehicle having side members, a vertical dash member carried by the front ends of the side members, an inclined toe-board secured to the rear face of the dash member, generally-triangular gussets secured between the toe-board and the dash member, a bottom plate secured to the bottoms of the side members and the bottoms of said gussets, and a floor-board secured between the side members and to the toe-board, said toe-board and said floor-board and said bottom plate having parts so related and secured together as to form a hollow and generally-tubular reinforcing structure connecting the side members.

4. A vehicle having side members, a vertical dash member carried by the front ends of the side members, an inclined toe-board secured to the rear face of the dash member, generally-triangular gussets secured between the toe-board and the dash member, a bottom plate secured to the bottoms of the side members and the bottoms of said gussets, a floor-board secured between the side members and to the toe-board, and side reinforcing members bracing the rear face of the dash at its opposite sides directly against said side members.

5. A vehicle having side members, a vertical dash member carried by the front ends of the side members, an inclined toe-board secured to the rear face of the dash member, generally-triangular gussets secured between the toe-board and the dash member, a bottom plate secured to the bottoms of the side members and the bottoms of said gussets, and a floor-board secured between the side members and to the toe-board, said toe-board and said floor-board and said bottom plate having parts so related and secured together as to form a hollow and generally-tubular reinforcing structure connecting the side members, in combination with a support for one end of an engine mounted on said reinforcing structure in the center line of the vehicle, whereby said structure transmits part of the weight of the engine to said side members.

6. A vehicle having side members, a vertical dash member carried by the front ends of the side members, an inclined toe-board secured to the rear face of the dash member, generally-triangular gussets secured between the toe-board and the dash member, a bottom plate secured to the bottoms of the side members and the bottoms of said gussets, and a floor-board secured between the side members and to the toe-board, said toe-board and said floor-board and said bottom plate having parts so related and secured together as to form a hollow and generally-tubular reinforcing structure connecting the side members, in combination with a support for one end of an engine mounted on said reinforcing structure in the center line of the vehicle, whereby said structure transmits part of the weight of the engine to said side members, and means for transmitting to said side members the remainder of the weight of the engine from the other end of the engine.

VICTOR W. KLIESRATH.